(12) United States Patent
Lu et al.

(10) Patent No.: US 8,999,438 B2
(45) Date of Patent: Apr. 7, 2015

(54) SYSTEMS AND METHODS FOR SUPER-HYDROPHOBIC AND SUPER-OLEOPHOBIC SURFACE TREATMENTS

(76) Inventors: Weixing Lu, Los Angeles, CA (US); Allan Roberts, Buena Park, CA (US)

(*) Notice: Subject to any disclaimer, the term of this patent is extended or adjusted under 35 U.S.C. 154(b) by 797 days.

(21) Appl. No.: 13/229,492

(22) Filed: Sep. 9, 2011

(65) Prior Publication Data

US 2013/0064990 A1    Mar. 14, 2013

(51) Int. Cl.
| | |
|---|---|
| B05D 1/36 | (2006.01) |
| B05D 1/20 | (2006.01) |
| B82Y 30/00 | (2011.01) |
| B82Y 40/00 | (2011.01) |
| B05D 5/08 | (2006.01) |

(52) U.S. Cl.
CPC . B05D 1/202 (2013.01); B05D 5/08 (2013.01); B82Y 30/00 (2013.01); B82Y 40/00 (2013.01)

(58) Field of Classification Search
CPC ........ B82Y 30/00; B82Y 40/00; B05D 1/202; B05D 1/204; B05D 1/206; B05D 1/208; B05D 3/046; G02F 1/3618; G02F 2202/027; Y10S 438/939

USPC .................................................. 427/201–204
See application file for complete search history.

(56) References Cited

U.S. PATENT DOCUMENTS

2009/0104347 A1* 4/2009 Van Benthem et al. ....... 427/201

OTHER PUBLICATIONS

Tsai (Langmuir 2007,23,12687-12692).*

* cited by examiner

Primary Examiner — Michael Cleveland
Assistant Examiner — Joel Horning
(74) Attorney, Agent, or Firm — Jerome E Sacks

(57) ABSTRACT

The field of the invention relates to systems and methods for surface treatments, and more particularly to systems and methods for surface treatments, modifications or coatings using micro- and nano-structure particles for both super-hydrophobic and super-oleophobic properties. In one embodiment, a method of treating surfaces to impart both super-hydrophobic and super-oleophobic properties includes the steps of pre-treating a substrate surface; assembling dual-scale nanoparticles onto the surface of the substrate; and treating the dual-scale nanoparticle coated surface with $SiCl_4$ to cross-link the nanoparticles to each other and to the surface of the substrate creating a robust nano-structured topographic surface having both super-hydrophobic and super-oleophobic properties.

9 Claims, 10 Drawing Sheets

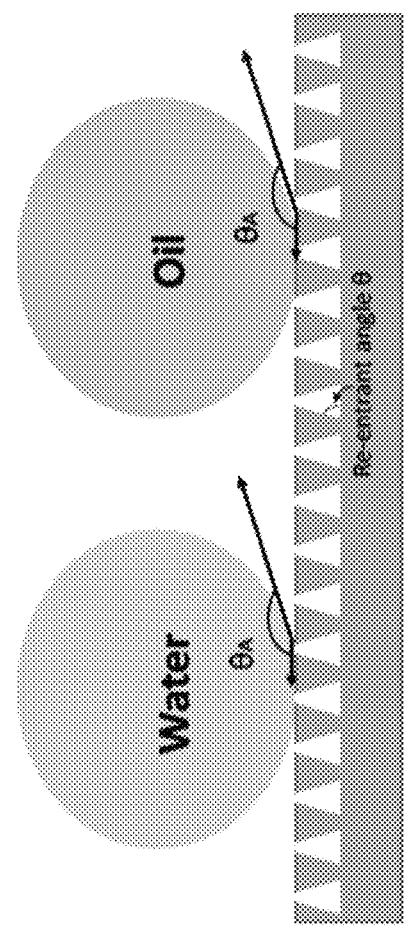
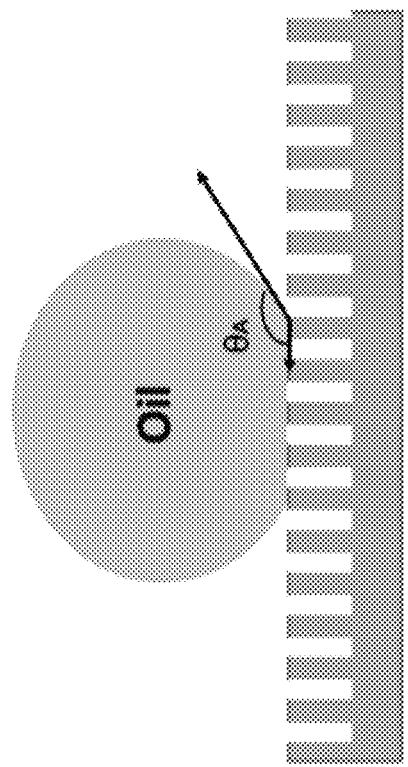

SYSTEMS AND METHODS FOR SUPER-HYDROPHOBIC AND SUPER-OLEOPHOBIC SURFACE TREATMENTS

FIELD OF THE INVENTION

The field of the invention relates to systems and methods for surface treatments, and more particularly to systems and methods for surface treatments, modifications or coatings using nanostructure materials for both super-hydrophobic and super-oleophobic properties.

BACKGROUND OF THE INVENTION

Coatings and surface modifications are used for a variety of applications including environmental protection, metal refinement, lubrication between moving parts, and maintenance. For example, large metal surfaces, antennas, and windows are coated to prevent the build-up of snow, ice, and fog. Boats are often treated with an anti-fouling paint to protect against materials that accumulate on wetted structures. Building and glass surfaces can be modified to become anti-soiling and stain resistant, respectively. Surface modifications can also render automobile windshields, airplane canopies, and optical devices self-cleaning. The advantages of appropriate surface coatings and modifications are well understood and appreciated. Recently, a number of recognized techniques for surface treatment use nanomaterials to produce effects that are more efficient and longer lasting than conventional coatings. For example, metallic stainless steel coatings sprayed with nanocrystalline powders demonstrate increased hardness when compared to traditional treatments. Hard ceramic nanocoatings made with titanium dioxide and a plasma torch renders metals very resistant to corrosion.

The extremely high ratio of surface area to volume of nanoparticles is a unique characteristic that provides for the synthesis and control of materials in nanometer dimensions. Accordingly, extensive work in the field of nanotechnology has been done to exploit new material properties and device characteristics through nanostructuring.

Among these new material properties, water-repelling hydrophobic surfaces and their production are extremely beneficial, for example, in the area of corrosion inhibition for metal, chemical and biological agent protection for non-metals, and so on. Over the past decade, research has been conducted to engineer the surface chemistry and roughness of solids to mimic the natural super-hydrophobic characteristics found in the lotus leaf. Super-hydrophobic surfaces and coatings possessing a so called "lotus leaf effect" have unique properties with very high water repellency. For example, the surfaces of many structures, such as aircraft surfaces, glass and plastics are susceptible to the buildup of ice, water, fog and other contaminants that can interfere with ordinary use. Super-hydrophobic surfaces on such structures can prevent or mitigate the buildup of ice, water fog and other contaminants by creating a microscopically rough surface containing sharp edges and air pockets in a material that sheds water well.

A super-hydrophobic surface is defined as possessing a water surface contact angle (CA) greater than 150° and a surface tension of approximately one-fourth of water. Since the surface tension of water is approximately 70 $mNM^{-1}$, the coated super-hydrophobic surface tension should be no more than several $mNM^{-1}$.

The first example of a super-hydrophobic surface was demonstrated in 1998 using an anodically oxidized fractal structured aluminum plate. Subsequently, engineers have developed several different textured surfaces with local surface geometries having super-hydrophobic surface CAs greater than 160°, even with octane. An example is disclosed in U.S. patent application Ser. No. 12/599,465, U.S. Publication No. 2010/0316842 A1, filed Apr. 14, 2008, for a "Tunable Surface" to Tuteja, et al., which is hereby incorporated by reference in its entirety. This application contemplates modifying surfaces to include a protruding portion to protrude toward a liquid and a re-entrant portion opposite the protruding portion to enhance the resistance/contact angle with any liquid. However, fabricating the necessary re-entrant angles and local surface geometric structures using this method is both time consuming and expensive. Specifically, the fabrication requires a Silicon dioxide ($SiO_2$) deposition followed by a costly two-step etching process comprising reactive ion etching of $SiO_2$ and subsequent isotropic etching of Si with the use of vapor-phase Xenon difluoride ($XeF_2$). Furthermore, this fabrication technology is only feasible for creation of the necessary re-entrant angles in localized surface geometric structures of micron sizes (e.g., approximately 20 μm).

Additionally, while a super-hydrophobic surface can provide excellent ice repellency on a clean surface, oil, dirt, salt and other contaminants already existing on the surface could enable additional ice accumulation. Therefore, the best surface modification technology for ice repellency will impart both super-hydrophobic and super-oleophobic properties. Such surfaces would be highly self-cleaning since they would tend to shed not only oil-based contaminants, but also water-based contaminants, thereby providing additional benefits such as anti-corrosion and ease of cleaning.

Similar to super-hydrophobic surfaces, a super-oleophobic surface is defined as any surface that reduces the tendency for an oil to attach to that surface or form a film on that surface. In particular, a super-oleophobic surface possesses an oil CA greater than 150°.

In another example of super-hydrophobic surface modifications, a biomimetic procedure was used to prepare super-hydrophobic cotton textiles. This procedure is discussed further in a paper by Hoefnagel et al., for "Biomimetic Superhydrophobic on Highly Oleophobic Cotton Textiles" (Hoefnagels, H. F., Wu, D., With, G. de, Ming, W. (2007) *Langmuir*, 23, 13158-163), which is hereby incorporated by reference in its entirety. This publication discloses a method for creating a super-hydrophobic (i.e., having a water CA greater than 155°) cotton textile by introducing silica particles in situ to cotton fibers to generate a dual-scale surface roughness, followed by hydrophobization with polydimethylsiloxane (PDMS). Although this approach can obtain moderately oleophobic surfaces (e.g., having an oil CA of approximately 140°), the resulting coating was not super-oleophobic (i.e., having an oil CA greater than 150°) because the coverage of the silica nanoparticles was not uniform in structure (e.g., low and out of control). Furthermore, the scalability of this process is limited and excludes various surface types including, for example, the surface of aircraft wings, because the thickness and roughness of the coated layer results in clustering of the nanoparticles and yields a very irregular surface morphology in micron scale.

Accordingly, an improved system and method for low-cost surface treatments having both super-hydrophobic and super-oleophobic properties to alleviate the problems discussed above is desirable.

SUMMARY OF THE INVENTION

The field of the invention relates to systems and methods for surface treatments, and more particularly to systems and methods for surface treatments, modifications or coatings using micro- and nano-structure particles for both super-hydrophobic and super-oleophobic properties. In one embodiment, a method of treating surfaces to impart both super-hydrophobic and super-oleophobic properties includes the steps of producing chemically active peroxides on a substrate surface; synthesizing mono-dispersed silica nanoparticles of differing sizes to obtain dual-scale nanoparticles; capping the dual-scale nanoparticles to render them hydrophobic; dipping the pre-treated substrate into a Langmuir-Blodgett (LB) trough filled with a water based subphase, the trough further having a particle layer spread over the surface of the water based subphase, the particle layer comprising the dual-scale nanoparticles for assembly of an ordered monolayer onto the surface of the substrate; raising the substrate into dry air to de-hydrate the surface of the substrate and obtain a chemical covalent bond between said ordered monolayer and the substrate surface; and treating the dual-scale nanoparticle coated surface with $SiCl_4$ to cross-link the nanoparticles to each other and to the surface of the substrate creating a robust nano-structured topographic surface having both super-hydrophobic and super-oleophobic properties.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 1c is a diagram of a non-wetted contact between a liquid drop and a rough surface;

FIG. 1d is a diagram of a non-wetted contact between a liquid and a rough surface with appropriate local surface geometry having a re-entrant angle.

DETAILED DESCRIPTION OF THE PREFERRED EMBODIMENTS

As described above, ice repellency, water repellency, anti-fog, non-stick, and dirt resistance behavior of a solid substrate typically depends on the wetting behavior of the solid surfaces by a liquid. On contact with a surface, adhesion forces between a liquid droplet and a solid substrate result in either complete or incomplete wetting. The liquid droplet will either remain as a droplet or spread out on the surface to form a thin liquid film. This hydrophobicity of the surface typically is characterized by the contact angle (CA) of the surface.

Generally, higher CAs produce surfaces with a higher hydrophobicity. For a solid substrate, when the CA of water or oil on the surface is larger than 90°, it is called hydrophobic or oleophobic, respectively. Surfaces with a CA of water or oil larger than 150° are referred to as super-hydrophobic or super-oleophobic. In contrast, surfaces with a CA of water or oil less than 90° are referred to as hydrophilic or oleophilic while surfaces with a CA of approximately 0° are referred to as super-hydrophilic or super-oleophilic. Some plants—for example, the lotus discussed above—can reach a contact angle of 170° introducing a self-cleaning effect.

Figure 1A:
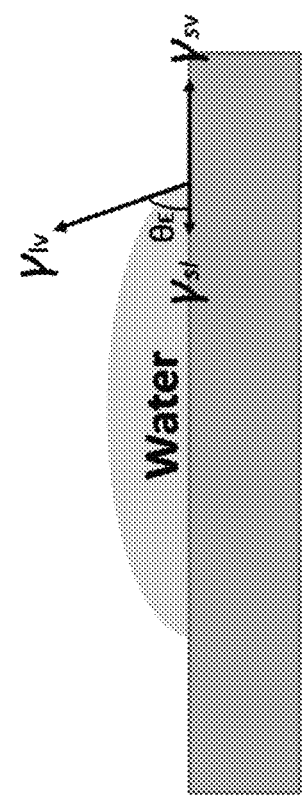
FIG. 1a is a diagram of a liquid drop on a flat substrate.
Figure 1B:
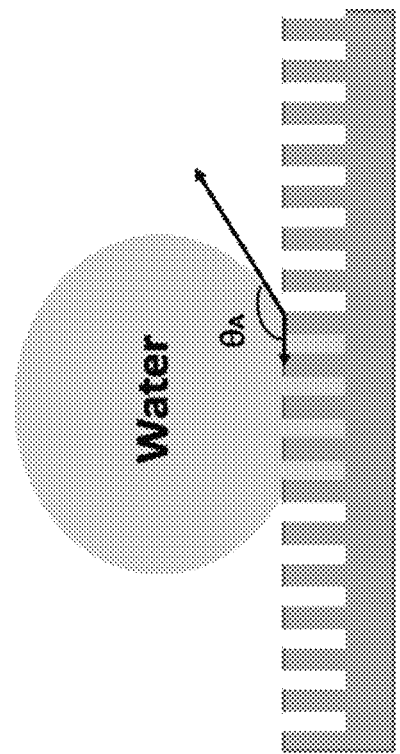
FIG. 1b is a diagram of a wetted contact between a liquid drop and a rough surface.

CA may refer to the equilibrium CA when the surface is smooth or to the apparent CA when the surface is rough. Turning to FIG. 1a, a liquid drop (e.g., water) is shown on a smooth surface illustrating equilibrium CA $\theta_E$. In order to predict the CA $\theta_E$ of a liquid droplet on a flat substrate, equation (1) may be used.

$$\cos\theta_E = (\gamma_{sv} - \gamma_{sl})/\gamma_{lv} \qquad (1)$$

where:
$\gamma_{sv}$=surface tension of the solid-vapor involved
$\gamma_{sl}$=surface tension of the solid-liquid involved
$\gamma_{lv}$=surface tension of the liquid-vapor involved It is well known that the wettability of solid substrates is governed by their surface free energy and surface geometrical structure (i.e., roughness). Therefore, controlling one of these two factors can modulate the surface wettability. FIGS. 1b-d illustrate the apparent CA $\theta_A$ of a rough surface. Two different models are commonly used to explain the effect of roughness on the apparent CA of liquid drops.

The first model, developed by Robert Wenzel, describes a homogenous wetting regime. Additional information can be found in an article for "Resistance of Solid Surfaces to Wetting by Water" (Wenzel, R. N., *Ind. Eng. Chem.* 1936, 28, 988), which is hereby incorporated by reference in its entirety. This model contemplates that liquid completely fills into the grooves of a rough surface where they are in contact. Higher surface roughness increases the available surface area of the solid, which modifies the surface CA according to equation (2):

$$\cos\theta_A = r\cos\theta_E \qquad (2)$$

where:
  $\theta_A$=apparent CA on a textured surface
  r=surface roughness factor
  $\theta_E$=equilibrium CA on a smooth surface of the same material An example of this model is provided with reference to FIG. 1b. In FIG. 1b, a wetted contact between a liquid and a rough substrate is illustrated. The rough substrate is a surface of a hydrophilic material. However, the apparent CA $\theta_A$ has a value between 150° and 90° demonstrating the hydrophobic behavior of the rough surface despite the hydrophilic material.

Alternatively, when dealing with a heterogeneous surface of various materials, a second model is needed to measure the apparent CA $\theta_A$. Additional information can be found in an article for "Wettability of Porous Surfaces" (Cassie, A. B. D., Baxter, S., *Trans. Faraday Soc.* 1944, 40, 546), which is hereby incorporated by reference in its entirety. This model assumes that vapor pockets are trapped underneath the liquid creating a composite surface. Accordingly, microscopic pockets of air remaining trapped underneath the liquid droplet create the super-hydrophobic nature of a rough surface. The chemical heterogeneity of the rough surface modifies the apparent CA $\theta_A$ according to equation (3-1):

$$\cos\theta_A = f_s \cos\theta_s + f_v \cos\theta_V \qquad (3\text{-}1)$$

where:
  $f_s$=area fractions of the solid on the surface
  $f_s$=area fractions of the solid on the surface
As $f_s + f_v = 1$, $\theta_S = \theta_E$, and $\theta_V = 180°$, equation (3-1) can be rewritten as equation (3-2):

$$\cos\theta_A = f_s(\cos\theta_E + 1) - 1 \qquad (3\text{-}2)$$

Unlike equation (2), the relationship described in equation (3-2) allows for the possibility that the apparent CA $\theta_A$ can be greater than 90° even with an equilibrium CA $\theta_E$ less than 90° due to the effects of surface roughness. Specifically, the surface roughness will increase the apparent angle even when the intrinsic CA of a liquid on a smooth surface is less than 90° because the trapped super-hydro-oleophobic vapor pockets can still enhance the CA. For example, FIG. 1c illustrates a non-wetted contact between a liquid and a rough substrate of a hydrophilic material. As shown, the apparent CA $\theta_A$ of an oil droplet is greater than 90° even with an equilibrium CA $\theta_E$ less than 90° due to the effects of the surface roughness. Therefore, in order to modify a solid surface to increase the apparent CA $\theta_A$ in one embodiment of the present invention, a particular textured surface exhibiting characteristics modeled in equation (3-2) is desirable.

A series of rough substrates with progressively increasing equilibrium CAs exhibits a transition from surfaces modeled by equation (2) to surfaces modeled by equation (3-2). Relating equations (2) and (3-2) in equation (4), a threshold equilibrium CA $\theta^C$ is determined:

$$\cos\theta^C = \frac{(f_s - 1)}{(r - f_s)} \qquad (4)$$

Because $r > 1 > f_s$, the critical value of the equilibrium CA $\theta^C$ for this transition is necessarily greater than 90°. Therefore, the creation of highly non-wetting surfaces (i.e., $\theta_A \gg 90°$) requires the equilibrium CA $\theta_E$ to be larger than the apparent CA $\theta_A$ that is greater than 90° (i.e., $\theta_E > \theta_A > 90°$). However, there are no reports of natural or artificial surfaces with a low enough surface energy to enable a equilibrium CA $\theta_E$ that is greater than 90° when in contact with alkanes such as decane or octane in developing super-hydrophobic/oleophobic surfaces.

In an attempt to create a surface with a low enough surface energy as discussed above, a third parameter—re-entrant local surface geometry—was combined with the parameters of surface energy and roughness. FIG. 1d shows a non-wetted contact between liquids and a rough substrate with appropriate local surface geometry having a re-entrant angle θ. This surface has both super-hydrophobic and super-oleophobic properties (i.e., $\theta_A > 150°$ for both water and oil). Fabricating different re-entrant local surface geometries is beneficial for constructing extremely non-wetting surfaces that can be modeled by equation (3-2) with water and various organic liquids. However, conventional methods generally require a silicon dioxide ($SiO_2$) deposition followed by a two-step etching process as discussed above. This process is both time-consuming and cost-inefficient. Furthermore, these methods only modify flat, hard surfaces and not curved or irregular surfaces such as convex or concave shapes. The process is also only feasible for creation of the necessary re-entrant angles in localized surface geometric structures of micron sizes (e.g., 20 μm).

Figure 2:
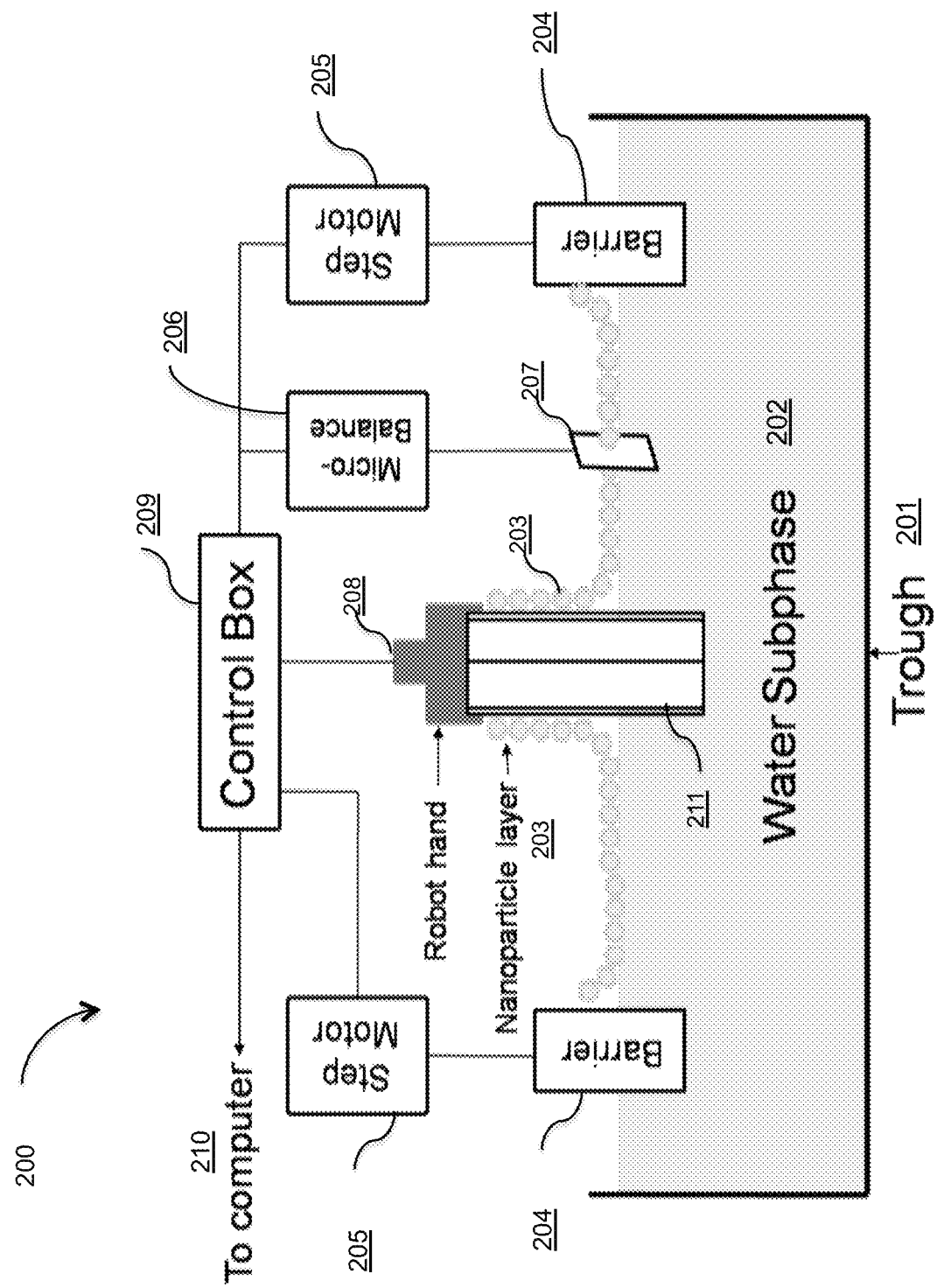
FIG. 2 is a functional schematic of a computer controllable Langmuir-Blodgett (LB) trough system for use with an exemplary embodiment of the present invention.

One approach to address these issues is shown in FIG. 2, which illustrates a computer controllable Langmuir-Blodgett (LB) trough system 200 for use with an exemplary embodiment of the present invention. The system 200 includes a LB trough 201 filled with a subphase 202 (e.g., water). A nanoparticle layer 203 is spread over the surface of the subphase 202. The nanoparticle layer 203 may be a series of monolayers of one or more types of amphiphilic micro-/nanoparticles spread at the interface between water and air typically consisting of a regular planar array of molecular layers having a well-defined and predetermined thickness. Automated step motors 205 control barriers 204, which are movable during a deposition process, in order to maintain a controlled surface pressure. The layer 203's effect on the surface pressure of the subphase 202 is measured through the use of a plate 207 coupled to a microbalance 206, which is configured to control the movable barriers 204. As one of ordinary skill in the art would appreciate, plate 207 may be a Wilhelmy plate, electronic wire probes, or other types of detectors.

The system 200 further includes a dipping device 208 operatively coupled to a control box 209 for lowering or raising a substrate 211 through the gas-liquid interface (i.e., layer 203 and subphase 202). The control box 209 is further coupled to both the microbalance 206 and step motors 205. A microprocessor computer 210 that provides control signals to the control box 209 allows automatically transferring an LB film to the solid substrate 211 by the successive deposition of a series of layers 203 onto the substrate 211.

Both the movement of the dipping device and the step motors are controlled and monitored by computer 210 to provide very high contact angles and very low surface tension (e.g., less than 5 mN/m). As is known in the art, the computer 210 may include a computer-usable medium having a sequence of instructions which, when executed by a processor, causes said processor to execute a process that controls the elements above. The system 200 may further include a user interface console, such as a touch screen monitor (not shown), to the computer 210 to allow the operator to preset various system parameters. User defined system parameters may include, but are not limited to, surface pressure, substrate submersion time, oxygen flow rate, and vacuum level.

Figure 3:
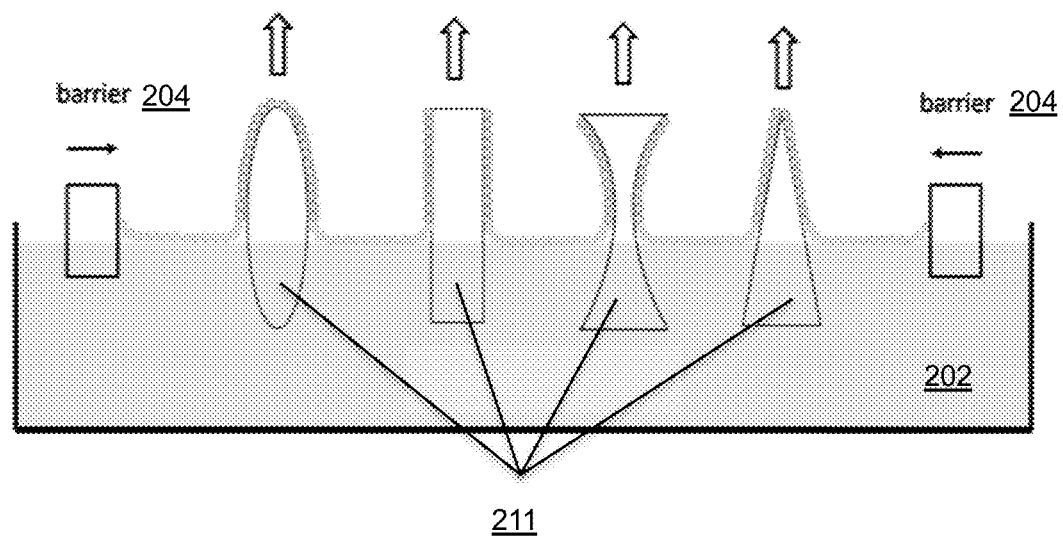
FIG. 3 is another functional schematic of a LB trough system for use with the present invention.

Accordingly, one benefit of system 200 is the flexibility to accommodate multiple substrates 211 of various shapes. Ultra-thin and uniform (at atomic levels) layers can be deposited on non-flat surfaces in a controllable, scalable, and low-cost manner. Turning to FIG. 3, an LB trough system, such as system 200, is shown configured to accommodate and dip different shapes and multiple substrates 211 at the same time, thereby alleviating both time and cost. In one example, substrate 211 can be carbon fiber, aluminum, or titanium as used in, for example, aircraft surfaces, antennas, wings, car surfaces, and boats; however, as one of ordinary skill in the art can appreciate, substrate 211 may include other metals, plastics, glass, textiles and other materials.

Figure 4:
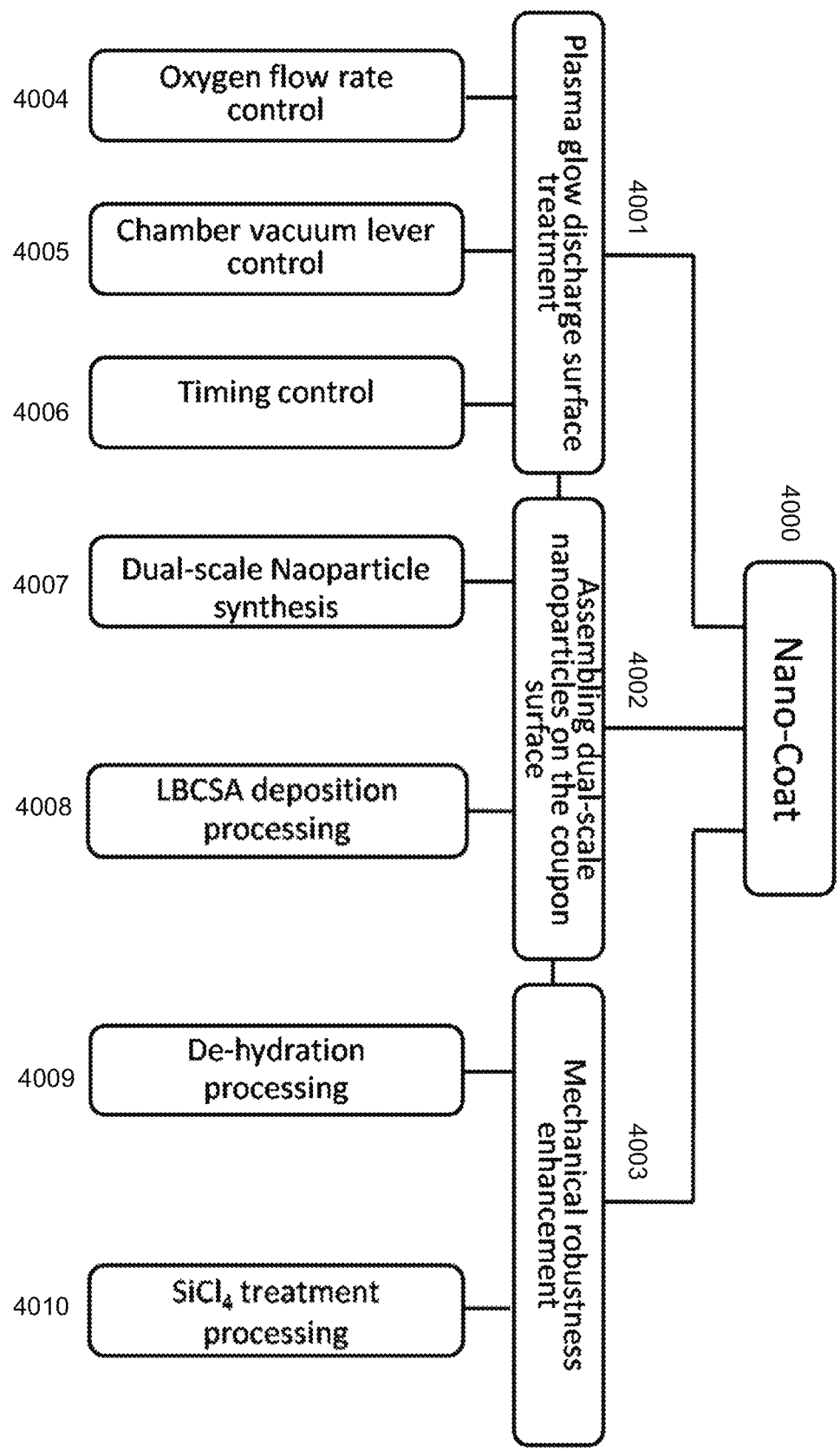
FIG. 4 is a flowchart of a process in accordance with a preferred embodiment of the present invention.

In a preferred embodiment of the present invention, FIG. 4 illustrates a process 4000 for a self-assembly nanocoating that may be executed by system 200. The process 4000 consists of three major processes: (1) plasma glow discharge surface treatment (action block 4001); (2) assembly of dual-scale nanoparticles on the surface (action block 4002); and (3) mechanical enhancement to increase surface durability and robustness (action block 4003).

Process 4000 provides additional benefits over conventional approaches for preparing various super-hydrophobic surfaces. In practice, conventional approaches for preparing super-hydrophobic surfaces can be categorized into two directions: top-down and bottom-up. Examples of top-down approaches include lithographic and template-based techniques, and plasma treatment of surfaces. Conversely, bottom-up approaches mostly involve self-assembly and self-organization. Examples of bottom-up approaches include chemical deposition, layer-by-layer (LBL) deposition, hydrogen bonding, and colloidal assemblies. Methods also exist based on the combination of both bottom-up and top-down approaches including polymer solution casting, phase separation, and electro-spinning As one of ordinary skill in the art would appreciate, a bottom-up approach most effectively modifies surfaces of aluminum, titanium, carbon fiber, glass and plastic. Although chemical deposition, including atomic layer deposition, can synthesize nanostructures in situ on the surface, to obtain the required re-entrant local surface geometry is costly and hard to control. Alternatively, traditional LBL and hydrogen bonding is not able to form the required nanostructure on the surface as well. Colloidal assemblies are able to assemble pre-synthesized nanostructures on the surface and are effective glass surface modifiers; however, conventional colloidal assemblies, including self-assembling and self-organization, require complex chemical reactions between the substrate surface and the nanoparticles. These reactions are limited to certain types of materials such as gold surfaces and molecules with thiol groups.

Conventional self-assembly methods rely on hard-to-control chemical reactions between micro-/nanoparticles and the treated surface to spontaneously form a 2-dimensional (2D) crystal structure on the treated surface. In contrast, process 4000 provides a highly controllable, bottom-up assembly method that can create the desired surface coating structure with far more precision. Using this approach, the precise nano-architecture is formed as part of the LB process. Once the desired uniform nanostructure is in place, a self-assembly related dehydration process is used to lock-in the structure by forming stronger chemical bonds between the micro-/nanoparticles and the treated surface without interference with the nanostructure. An additional gas phase chemical ($SiCl_4$) treatment cross-links the nanoparticles to each other, and the nanoparticles to the surface. This produces the desired permanent, stabilized, scratch-resistant film on the substrate 211 surface. Thus, process 4000 is a surface engineering method that can precisely control the application of micro-/nonoparticles, metal particles, silica particles and colloidal particles onto the treated surface of many common materials—including, for example, metal, glass, plastic and fiber composites—in a manner that is controllable using an engineering process rather than a spontaneous chemical reaction method.

In order to activate the substrate 211 surface for self-assembly, the process begins with a plasma-glow discharge pre-treatment of a substrate 211 surface (action block 4001) to produce peroxides on the surface. The surface will undergo oxidation when exposed to these oxidative plasmas and brought into contact with air after exposure to gas plasmas (action block 4004). The extent of oxidation greatly depends on the composition of gas, the acrylic substrate and discharge conditions (action block 4005). The effect of plasma exposure time on the concentration of generated peroxides is adjusted when the applied power and pressure are fixed to obtain a maximum concentration of peroxides (action block 4006).

In one example, a small standard plasma reactor consisting of a stainless steel chamber with a pair of stainless steel discharge electrodes is used to pre-treat the substrate surface. The upper electrode may be connected to a 13.56 MHz radio frequency generator via an impedance matching circuit and the lower electrode will be grounded. The system pressure before discharge may be monitored by a Hoyt thermocouple vacuum gauge connected downstream from the reactor. The rate of oxygen may be measured by a mass flow controller with nitrogen calibration of the gauge reading for oxygen gas.

Once the substrate 211 surface has been treated, the process 4000 may proceed in assembling dual-scale nanoparticles onto the pretreated surface (action block 4002). The synthesis of dual-scale nanoparticles begins with mono-dispersed silica nanoparticles of differing sizes (e.g., 20 nm and 300 nm-10 µm), as shown in FIG. 5a. The silica nanoparticles are then modified with different functional groups. Finally, the particles are synthesized by attaching small particles onto large particles via reactions between functional groups (action block 4007).

Figure 5:
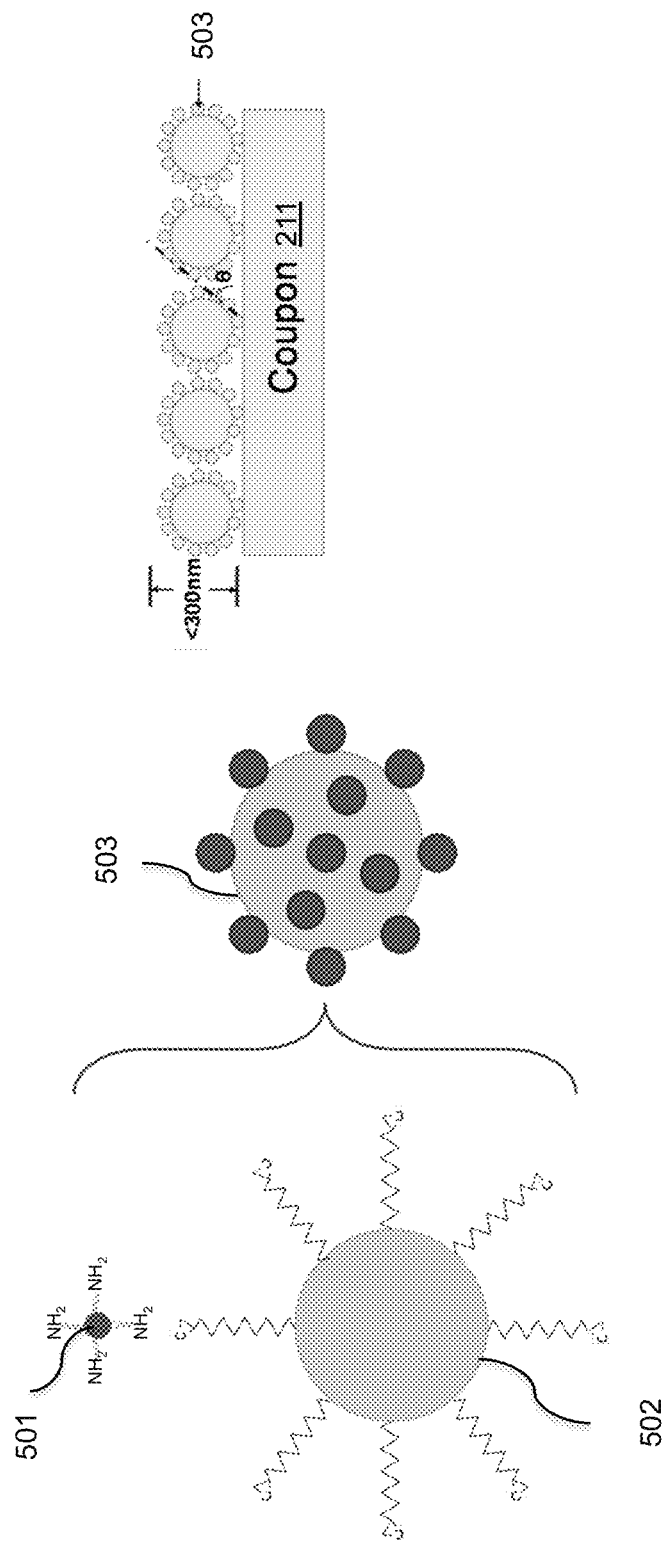
FIG. 5a is a diagram illustrating an exemplary nanoparticle synthesis in accordance with a preferred embodiment of the present invention.
FIG. 5b is a diagram illustrating an exemplary application of a dual-scale nanoparticle onto a substrate surface in accordance with a preferred embodiment of the present invention.

In one embodiment, amino-functionalized small silica nanoparticles may be used for synthesis. FIG. 5 shows an amine 501 attaching to a larger mono-dispersed silica nanoparticle 502 to obtain a synthesized dual-scale silica nanoparticle 503 via reactions between functional groups. A mixture of Tetraethyl orthosilicate (TEOS) and 3-aminopropyltriethoxysilane (APS) in a volume ratio of 9:1 (e.g., 4.5 mL TEOS and 0.5 mL APS), 4:1 or 1:1 is added, drop-wise, under magnetic stirring, to a flask containing 15 mL of ammonia solution and 200 mL of ethanol. The reaction is carried out at approximately 60° C. for about 16 hours under $N_2$ atmosphere. The small nanoparticles (approximately 20 nm) are separated by centrifugation and the supernatant is discarded. These particles are washed with ethanol and vacuum-dried at approximately 50° C. for about 16 hours.

In an alternative embodiment, epoxy-functionalized large silica nanoparticles may be used. At room temperature (e.g., 20-25° C.), 10 ml of TEOS may be added, drop-wise, under magnetic stirring, to a flask containing 21 mL of ammonia solution, 75 mL of isopropanol, and 25 mL of methanol. Silica microparticles less than 10 µm (e.g., 300 nm to 10 µm) in diameter can be used. After about 5 hours, the particles will be separated by centrifugation, washed with distilled water, ethanol, and vacuum-dried at approximately 50° C. for about 16 hours. About 1.5 grams of silica nanoparticles are redispersed into 40 mL of dry toluene and 0.2 g of 3-glycidoxypropyl (GPS) in 5 ml dry toluene can be added, drop-wise, to the silica suspension under vigorous stirring. The suspension may be stirred at about 50° C. under $N_2$ atmosphere for about 24 hours. The particles are then separated by centrifugation, washed with toluene, and vacuum-dried at approximately 50° C. for about 16 hours.

In yet another embodiment, an aldehyde-amine approach may be used to synthesize dual-scale nanoparticles. Approximately 0.1 g of amino-functionalized small silica nanoparticles may be suspended in 100 mL of a phospate buffer solution and about 0.5 g of aldehyde-functionalized large silica nanoparticles may be suspended in 100 mL of phosphate buffer solution, respectively. Subsequently, the silica nanoparticle suspension may be added, drop-wise under vigorous stirring, into the silica nanoparticle suspension. The suspension is stirred under $N_2$ atmosphere for about 24 hours. The particles are then separated by centrifugation and washed with distilled water.

As part of the synthesis of action block 4007, the dual-scale particles are further functionalized to render them hydrophobic. For example, 2 mL of the cleaned dual-scale silica nanoparticles solution is diluted into 14 mL of absolute ethanol, 1 mL water, and 100 µL 3-aminopropyl (diethoxymethylsilane). 97% 3-aminopropylmethyldiethoxysilane (APDES) is added with vigorous stirring. The solution is stirred overnight and then heated at 100° C. for one hour while covered in aluminum foil. The functionalized sample is cleaned by centrifugation into ethanol and methanol, in 15-minute intervals for a total of 5 intervals. The solution-based sample is then used for deposition.

After the synthesized hydrophobic nanoparticles are obtained, a surface with a dual-scale hierarchical structure is developed by depositing the dual-scale nanoparticles on the pretreated surface (action blocks 4008). The highly purified dual-scale nanoparticles having a diameter of less than 10 µm (the diameter of the mono-dispersed dual-scale particles can be in the range of a few tens of nanometers to a few hundred microns) is spread under air/water suspension and the typical isotherm will be measured using the LB trough 201 of system 200. An appropriate surface pressure is selected for the deposition and the dual-scale nanoparticles are assembled onto the activated substrate 211 surface, as shown in FIG. 5b.

Figure 6:
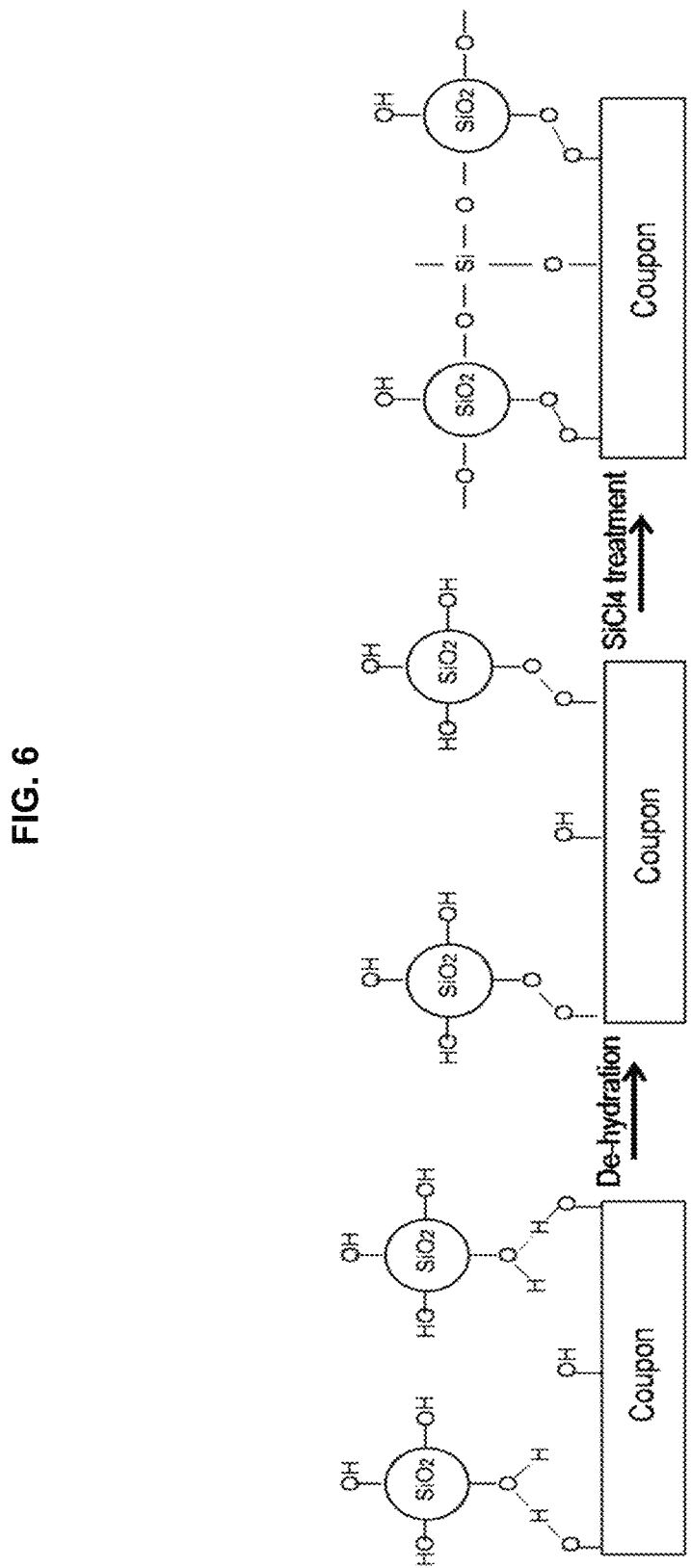
FIG. 6 is a diagram illustrating an exemplary reaction resulting from a mechanical enhancement in accordance with a preferred embodiment of the present invention.
Figure 7:
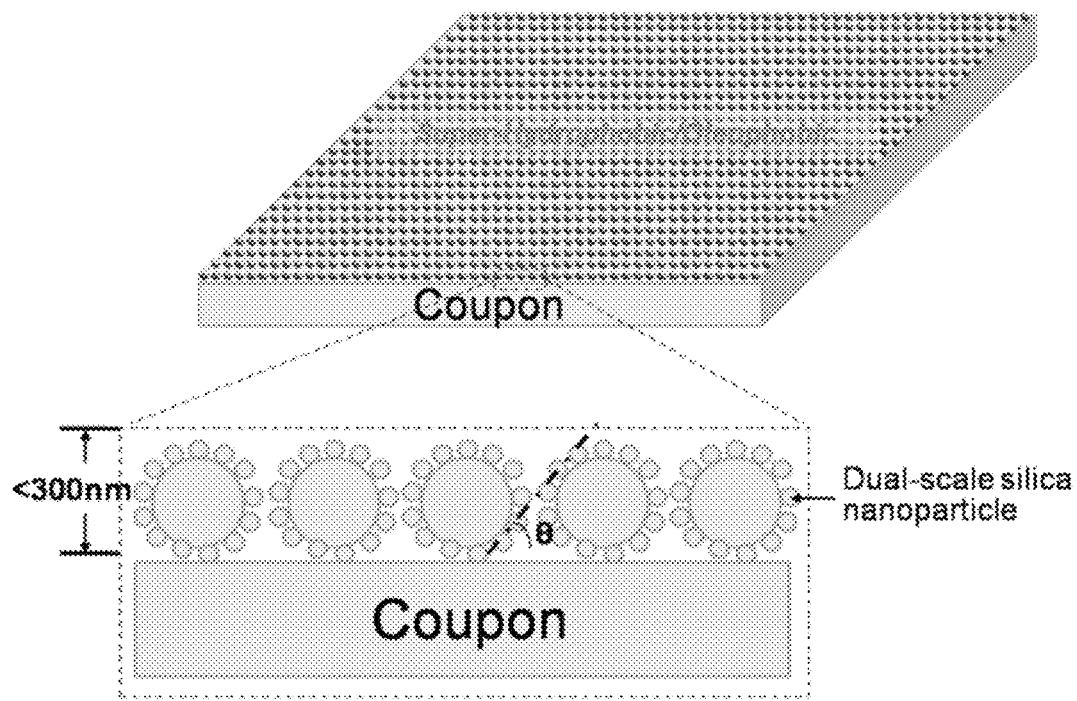
FIG. 7 is another diagram illustrating the structure of a super-hydrophobic/super-oleophobic surface in accordance with a preferred embodiment of the present invention.

Once the uniform dual-scale silica nanoparticles are assembled onto the target surface containing peroxides, process 4000 continues with a mechanical robustness enhancement 4003. The surface of substrate 211 is dried at room temperature (e.g., 20-25° C.) to eliminate water and form covalent bonds between the nanoparticles and surface (action block 4009). To further increase the robustness of the coating, the surface is treated with $SiCl_4$, which cross-link the nanoparticles to each other as well as to the surface (action block 4010). An example reaction creating cross-links is shown in FIG. 6. As illustrated, the dual-scale-Silica nanoparticle matrix undergoes dehydration to remove a hydrogen bond and to form covalent bonds between the nanoparticles and the surface. Subsequently, the dual-scale nanoparticle matrix monolayer is further polymerized to cross-link the nanoparticles to each other as well as to the surface by means of $SiCl_4$ treatment. As silica is a very salt stable material that is commonly used in biomedical devices, the silica-based nanostructuring additionally possesses highly salt-tolerant and nonhazardous properties that are beneficial in marine environments. Turning to FIG. 7, the resultant dual-scale nanoparticle matrix is strongly bonded to the surface. This lightweight, thin-film coating creates a super-hydrophobic and super-oleophobic surface that is permanent, durable and highly scratch resistant.

Figure 8:
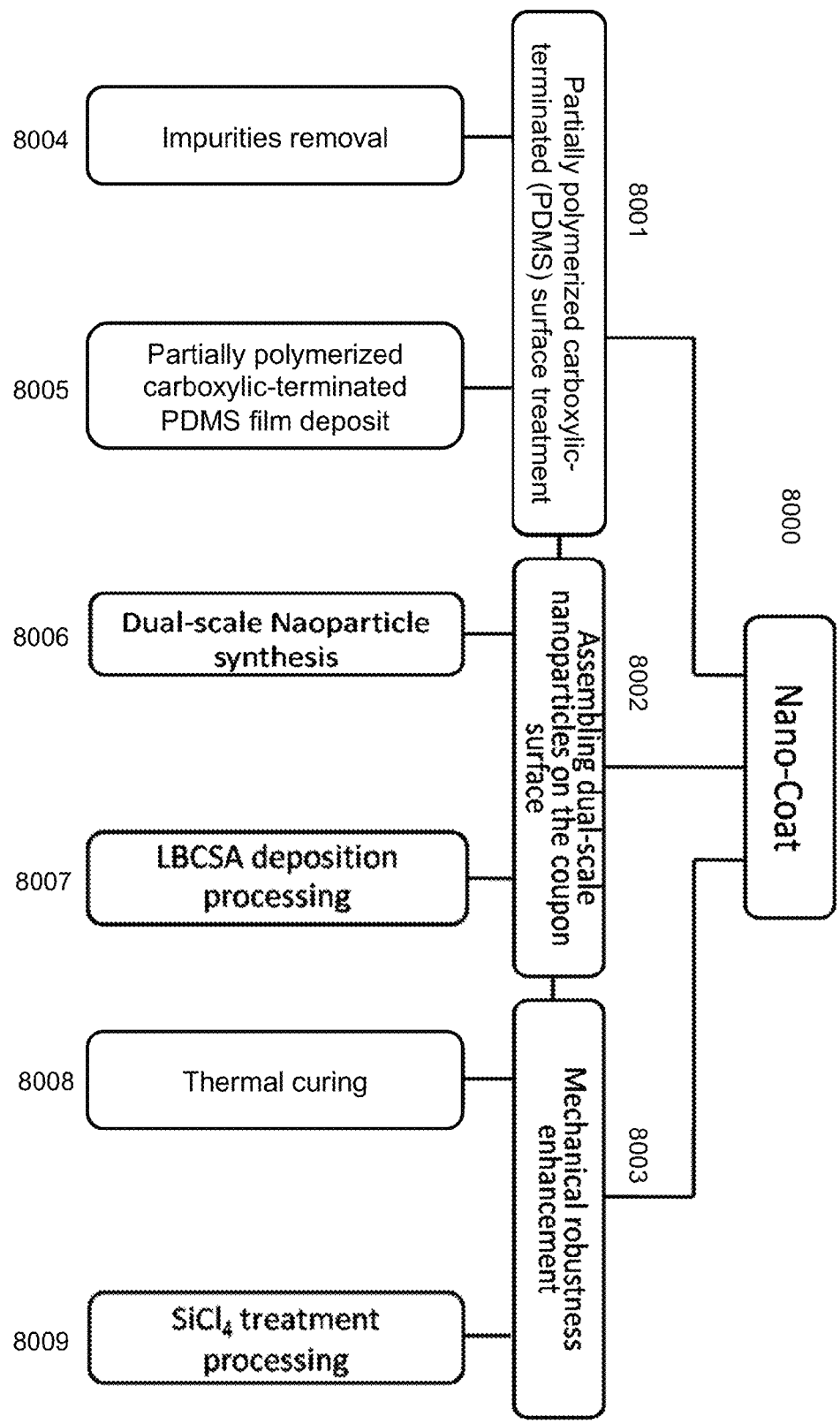
FIG. 8 is another flowchart of a process in accordance with an alternative embodiment of the present invention.

Turning to FIG. 8, another process 8000 that provides for a self-assembly nanocoating that may be executed by system 200 is shown. Like with process 4000, process 8000 consists of three major processes: (1) partially polymerized carboxylic-terminated polydimethylsiloxane (PDMS) surface treatment (action block 8001); (2) assembly of dual-scale nanoparticles on the surface (action block 8002); and (3) mechanical enhancement to increase surface durability and robustness (action block 8003).

Similar to process 4000, process 8000 begins with a pre-treatment of the substrate 211 surface. In this alternative embodiment, activating the substrate 211 surface for self-assembly comprises a modification of the substrate 211 surface with a partially polymerized carboxylic-terminated PDMS film (action block 8001). The surface is first cleaned to remove possible impurities (action block 8004). In one example, millipore water and ethanol can be used to clean substrate 211. The substrate surface is then pre-modified with a partially polymerized carboxylic-terminated PDMS film (action block 8005) in order to obtain a robust binding between the silica or polycarbonate-based surface and the assembled nanoparticles as discussed in process 4000. This thin film can be applied through LB monolayer deposition (e.g., using an LB system such as system 200) or spin coating (e.g., on flat substrates).

As an example of pre-treating the substrate 211 surface, a PDMS solution is prepared in chloroform (4 mg/mL). Using an LB system—e.g., system 200—the solution (approximately 100 µL) is spread onto a water based sub-phase containing $CdCl_2$ ($2\times10^{-4}$) and $KHCO_3$ (2.4×M); the sub-phase has a pH of about 7.65 and a temperature of about 19° C. The computer-controlled barriers 204 of system 200 compresses the floating LB film at approximately 5 mm/min to a surface pressure of about 25 mN/m. The substrate 211 is vertically dipped at a speed of about 10 mm/min. Microbalance 206 monitors surface pressure and transfer ratios for these films and computer 210 adjusts the appropriate deposition parameters. Following the uniform PDMS film deposition, substrate 211 is dried for further enhancement of the binding between the glass surface and the LB PDMS layer.

Following the alternative method for pre-treatment of the substrate 211 surface, process 8000 proceeds, like process 4000, in assembling dual-scale nanoparticles onto the pre-treated surface (action block 8002). Mono-dispersed silica nanoparticles of differing sizes (e.g., 20 nm and 300 nm-10 µm as shown in FIG. 5a) are modified with different functional groups. The silica nanoparticles are synthesized by attaching small particles onto large particles via reactions between functional groups (action block 8006). As described in process 4000, amino-functionalized small silica nanoparticles, epoxy-functionalized large silica nanoparticles, and aldehyde-amine nanoparticles may be used for synthesis. Capping the dual-scale nanoparticles with functional groups renders the nanoparticles hydrophobic for deposit onto the substrate surface.

After the synthesized hydrophobic nanoparticles are obtained, a surface with a dual-scale hierarchial structure is developed by depositing the dual-scale nano-particles on the pretreated surface (action blocks 8007). The highly purified dual-scale nanoparticles having a diameter of less than 10 µm (the diameter of the mono-dispersed dual-scale particles can be in the range of a few tens of nanometers to a few hundred microns) is spread under air/water suspension and the typical isotherm will be measured using the LB trough 201 of system 200. An appropriate surface pressure is selected for the deposition and the dual-scale nanoparticles are assembled onto the pre-treated substrate 211 surface.

Figure 9:
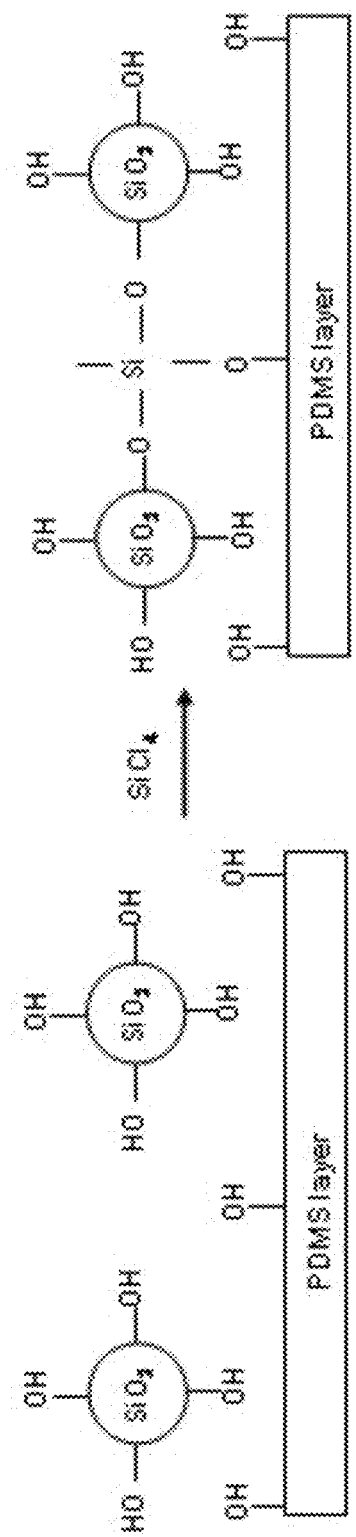
FIG. 9 is a diagram illustrating an exemplary reaction resulting from a mechanical enhancement in accordance with a preferred embodiment of the present invention.

Once the uniform dual-scale silica nanoparticles are assembled onto the target surface containing the partially polymerized carboxylic-terminated PDMS monolayer, process 8000 continues with a mechanical robustness enhancement 8003. The surface of substrate 211 is thermally cured at about 50° C. for a few minutes (action block 8008) to fully polymerize the PDMS coating. As the PDMS layer becomes fully polymerized, the nanoparticles will be partially embedded in the PDMS matrix while sustaining local surface nanostructure geometry. To further increase the robustness of the coating, the surface is treated with $SiCl_4$, which cross-link the nanoparticles to each other, the nanoparticles to the thin PDMS layer, and the PDMS layer to the substrate surface (action block 8009). An example reaction creating cross-links is shown in FIG. 9. As illustrated, the dual-scale nanoparticle matrix monolayer is polymerized to cross-link the nanoparticles to each other as well as to the PDMS layer by means of $SiCl_4$ treatment. The PDMS layer is similarly cross-linked to the substrate surface (not shown). As PDMS and silica are very salt stable materials that are commonly used in microfluidic devices, the PDMS and silica-based nanostructuring additionally possess highly salt-tolerant and nonhazardous properties that are beneficial in marine environments. The resultant dual-scale nanoparticle matrix is strongly bonded to the surface as shown in FIG. 7. This lightweight, thin-film coating creates a super-hydrophobic and super-oleophobic surface that is permanent, durable and highly scratch resistant.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions described herein is merely illustrative, and the invention may appropriately be performed using different or additional process actions, or a different combination or ordering of process actions. For example, this invention is particularly suited for coating metallic substrates, such as aluminum; however, the invention can be used for a variety of substrate materials, shapes and sizes. Additionally and obviously, features may be added or subtracted as desired. Accordingly, the invention is not to be restricted except in light of the attached claims and their equivalents.

What is claimed is:

1. A method of treating substrate surfaces to impart them with super-hydrophobic and super-oleophobic properties comprising:
    (a) pre-treating the substrate surface to produce chemically active peroxides on the surface;
    (b) synthesizing monodispersed silica nanoparticles and monodispersed larger silica particles;
    (c) modifying the monodispersed silica nanoparticles and monodispersed larger silica particles prepared in step (b) with different functional groups, wherein the smaller particles attach to the larger particles via chemical reactions between the functional groups, producing dual-scale particles then having hydrophobic properties;
    (d) submersing the substrate into a Langmuir-Blodgett (LB) trough apparatus, the apparatus having a water sub-phase with a monolayer of the dual-scale particles spread on the sub-phase surface;
    (e) raising the substrate from said sub-phase into the air at a first speed to deposit the monolayer of dual-scale particles onto the substrate surface, wherein the first speed allows the deposited dual-scale particles on the surface to have enough time to undergo a dehydration process and form covalent bonds between the monolayer of dual-scale particles and the surface, the monolayer of dual-scale particles is a formation of a 2-dimensional planar array structure with a predetermined thickness having re-entrant angles; and
    (f) treating the substrate surface with $SiCl_4$ to cross-link the dual-scale particles to each other and to the surface, wherein the substrate surface is coated with a nanostructured topographic surface retaining the re-entrant angles of the structure to impart super-hydrophobic and super-oleophobic properties.

2. The method of claim 1, wherein pre-treating the substrate surface in step (a) comprises placing the substrate in a plasma reactor chamber for exposure to oxidative plasmas and bringing the substrate surface into contact with the air.

3. The method of claim 1, wherein the monodispersed silica nanoparticles are 20 nm in size and the monodispersed larger silica particles are 300 nm to 10 μm in size.

4. The method of claim 1, wherein the modification of step (c) uses one of the silica nanoparticles or larger silica particles selected from the group consisting of: amino-functionalized silica nanoparticles, epoxy-functionalized larger silica particles, and aldehyde-amine-functionalized silica nanoparticles.

5. The method of claim 1, wherein the dehydration process of step (e) occurs at room temperature.

6. The method of claim 1, wherein the LB trough apparatus is computer-controlled.

7. The method of claim 6, wherein raising the substrate in step (e) at a first speed is controlled by the computer.

8. The method of claim 1, wherein the substrate has a curved surface.

9. The method of claim 1, wherein the dual-scale particles are functionalized with 3-aminopropylmethyldiethoxysilane (APDES) in step (c).

* * * * *